(12) United States Patent
Chang et al.

(10) Patent No.: US 10,981,273 B2
(45) Date of Patent: Apr. 20, 2021

(54) ACTION TEACHING METHOD FOR ROBOTIC ARM AND GESTURE TEACHING DEVICE

(71) Applicant: DELTA ELECTRONICS, INC., Taoyuan (TW)

(72) Inventors: Ke-Hao Chang, Taoyuan (TW); Cheng-Hao Huang, Taoyuan (TW); Chun-Ying Chen, Taoyuan (TW); Yen-Po Wang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 339 days.

(21) Appl. No.: 16/050,213

(22) Filed: Jul. 31, 2018

(65) Prior Publication Data

US 2019/0299402 A1 Oct. 3, 2019

(30) Foreign Application Priority Data

Apr. 3, 2018 (CN) .......................... 201810291189.2

(51) Int. Cl.
*B25J 9/16* (2006.01)
*B25J 13/08* (2006.01)

(52) U.S. Cl.
CPC ............. *B25J 9/163* (2013.01); *B25J 9/1697* (2013.01); *B25J 13/08* (2013.01)

(58) Field of Classification Search
CPC ........... B25J 9/163; B25J 9/1697; B25J 13/08
See application file for complete search history.

(56) References Cited

U.S. PATENT DOCUMENTS

| | | | | |
|---|---|---|---|---|
| 5,937,143 A | * | 8/1999 | Watanabe | B25J 9/1671 |
| | | | | 700/264 |
| 9,545,719 B2 | * | 1/2017 | Huang | B25J 9/1671 |
| 10,596,700 B2 | * | 3/2020 | Corkum | B25J 9/0081 |
| 10,723,022 B2 | * | 7/2020 | Corkum | B25J 9/1697 |
| 2016/0229052 A1 | * | 8/2016 | Touma | B25J 9/161 |
| 2017/0246745 A1 | * | 8/2017 | Kobayashi | B25J 9/1697 |

FOREIGN PATENT DOCUMENTS

| | | |
|---|---|---|
| CN | 103347662 A | 10/2013 |
| TW | 201532760 A | 9/2015 |
| TW | 201805127 A | 2/2018 |

* cited by examiner

*Primary Examiner* — Nicholas Kiswanto
(74) *Attorney, Agent, or Firm* — Kirton McConkie; Evan R. Witt

(57) ABSTRACT

An action teaching method is provided for teaching a robotic arm of a robotic arm system through a gesture teaching device. In a step (a), a touch condition of a user's finger is sensed by the touch sensing unit. In a step (b), a sensing result of the touch sensing unit is transmitted to an identification unit, so that a touch information is identified by the identification unit. In a step (c), the touch information is transmitted to a teaching unit, so that the teaching unit actuates a corresponding operation of the robotic arm system according to the touch information. In a step (d), an operating result of the robotic arm system is shown on a display unit, so that the user judges whether the operating result of the robotic arm system is successful through the display unit.

18 Claims, 12 Drawing Sheets

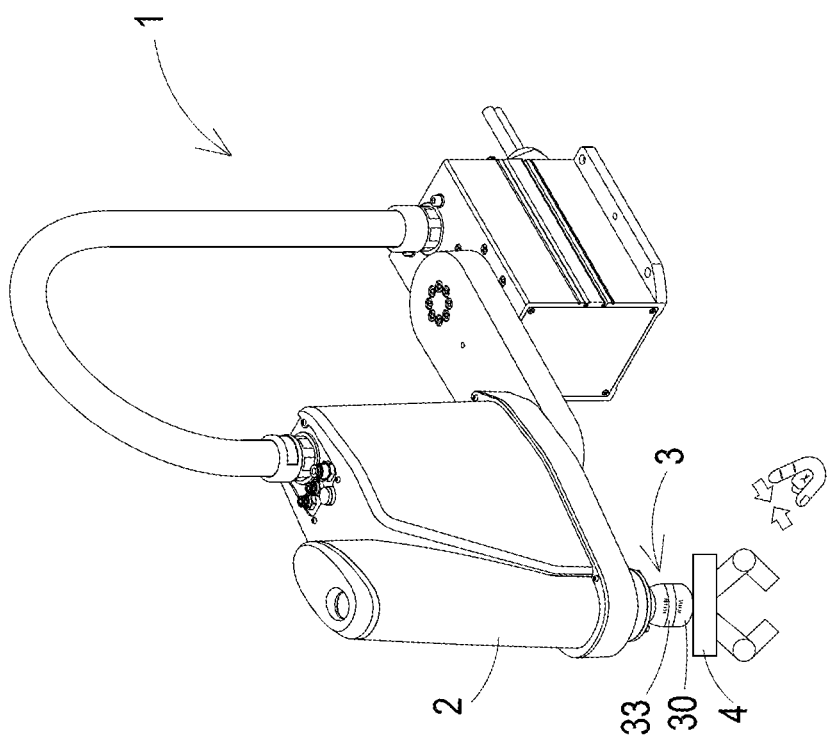

ACTION TEACHING METHOD FOR ROBOTIC ARM AND GESTURE TEACHING DEVICE

FIELD OF THE INVENTION

The present disclosure relates to an action teaching method, and more particularly to an action teaching method for a robotic arm and a gesture teaching device using the action teaching method.

BACKGROUND OF THE INVENTION

Recently, with the development of mechanisms, automatic control technologies and computer technologies, the robotic arm system has been widely used in various industries. The robotic arm system can be used to control the robotic arm to perform various highly-repetitive tasks in order to automatically produce and assemble the products in the highly-efficient and stable manner. For operating the robotic arm, it is necessary to perform three steps of moving the robotic arm, teaching the robotic arm and writing an application program. In the step of moving the robotic arm, the robotic arm has to be moved to a required position in the space. In the step of teaching the robotic arm, the robotic arm memorizes the required position or the trajectory in the space. The step of writing the application program is to automatically move the robotic arm according to the user's intention.

Conventionally, there are three methods of teaching the robotic arm. The first method uses a teach pendant. The teach pendant is equipped with various interfaces and buttons. The user can operate the teach pendant to implement the steps of moving the robotic arm, teaching the robotic arm and writing the application program. The second method uses a computer software. The computer software contains various virtual interfaces and buttons. The user can operate the computer program to implement the steps of moving the robotic arm, teaching the robotic arm and writing the application program. The third method uses a teaching technology. After the robotic arm is manually moved by the user's hand, the teach pendant or the computer software is used to perform the step of teaching the robotic arm and the step of writing the application program.

Since the above three methods of teaching the robotic arm have to use the teach pendant or the computer software, the action of the robotic arm is neither nimble nor intuitive. In other words, the user is unable to intuitively operate the robotic arm to simultaneously complete the steps of moving the robotic arm, teaching the robotic arm and writing the application program.

Therefore, there is a need of providing an action teaching method for a robotic arm and a gesture teaching device using the action teaching method in order to overcome the above drawbacks.

SUMMARY OF THE INVENTION

The present disclosure provides an action teaching method for a robotic arm and a gesture teaching device using the action teaching method. When the user's finger is contacted with the gesture teaching device, which is disposed on a robotic arm of a robotic arm system, to operate the robotic arm, the touch condition of the finger is sensed by the gesture teaching device. The user is able to intuitively operate the robotic arm without the need of additionally using the teach pendant or the computer software. By directly touching the gesture teaching device, the three steps of moving the robotic arm, teaching the robotic arm and writing the application program are integrated. In other words, the action teaching method of the present disclosure is nimble and intuitive.

In accordance with an aspect of the present disclosure, there is provided an action teaching method for teaching a robotic arm of a robotic arm system through a gesture teaching device. The gesture teaching device is installed on the robotic arm. The action teaching method includes the following steps. In a step (a), a finger of a user is contacted with a touch sensing unit of the gesture teaching device to operate the robotic arm, so that a touch condition of the finger is sensed by the touch sensing unit. In a step (b), a sensing result of the touch sensing unit is transmitted to an identification unit of the gesture teaching device, so that a touch information about the finger of the user on the touch sensing unit is identified by the identification unit. In a step (c), the touch information is transmitted from the identification unit to a teaching unit of the gesture teaching device, so that the teaching unit actuates a corresponding operation of the robotic arm system according to the touch information. In a step (d), an operating result of the robotic arm system is shown on a display unit of the gesture teaching device, so that the user judges whether the operating result of the robotic arm system is successful through the display unit.

In accordance with another aspect of the present disclosure, there is provided a gesture teaching device, which is installed on a robotic arm of a robotic arm system, for teaching the robotic arm. The gesture teaching device includes a touch sensing unit, an identification unit, a teaching unit and a display unit. When a finger of a user is contacted with the touch sensing unit to operate the robotic arm, the touch sensing unit is used to sense a touch condition of the finger. The identification unit is in communication with the touch sensing unit. The identification unit is used to identify a touch information about the finger of the user according to a sensing result from the touch sensing unit. The teaching unit is in communication with the identification unit and the robotic arm system. The teaching unit actuates a corresponding operation of the robotic arm system according to the touch information. The display unit is used to show an operating result of the robotic arm system, so that the user judges whether the operating result of the robotic arm system is successful through the display unit.

The above contents of the present disclosure will become more readily apparent to those ordinarily skilled in the art after reviewing the following detailed description and accompanying drawings, in which:

BRIEF DESCRIPTION OF THE DRAWINGS

FIG. 12 schematically illustrates an eighth control gesture for the robotic arm of the robotic arm system as shown in FIG. 2.

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
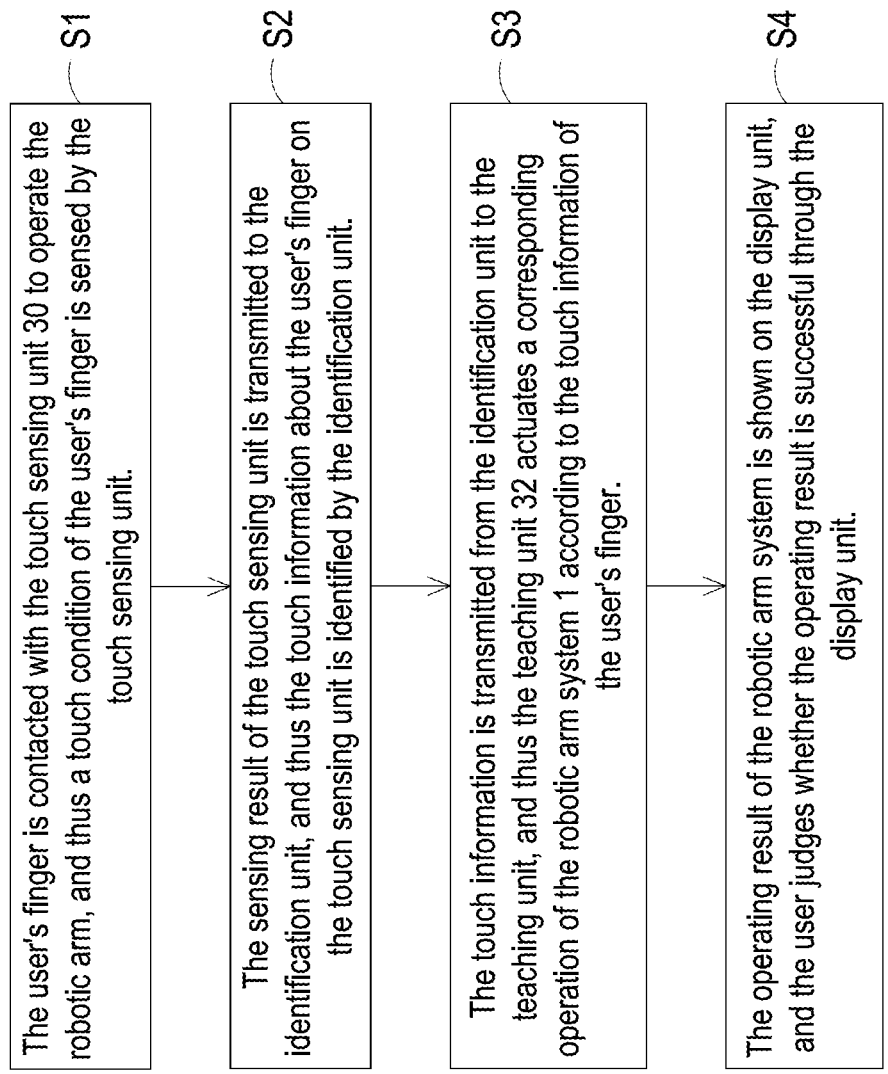
FIG. 1 is a flowchart illustrating an action teaching method for a robotic arm according to an embodiment of the present disclosure.
Figure 2:
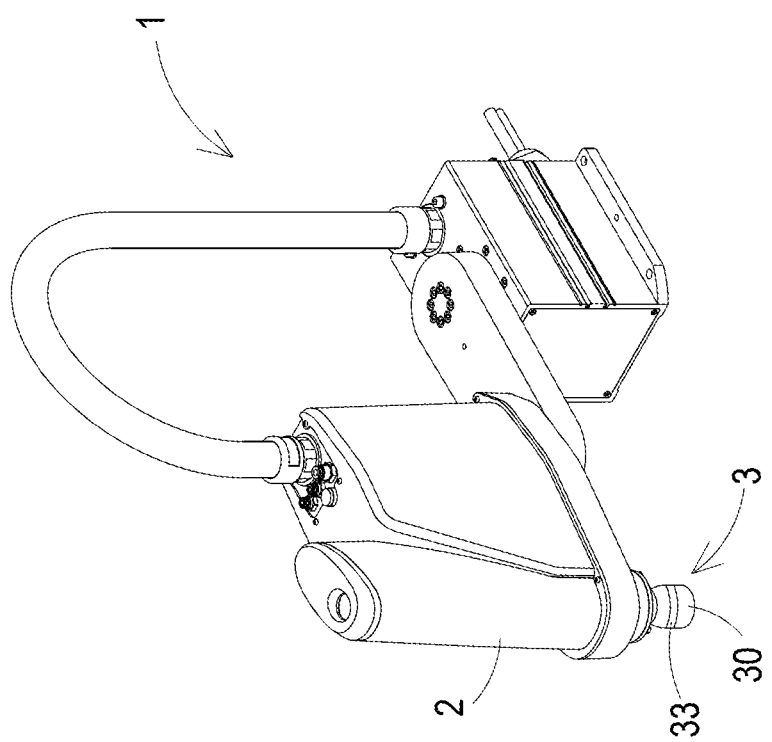
FIG. 2 schematically illustrates the structure of a robotic arm system using the action teaching method of FIG. 1.
Figure 3:
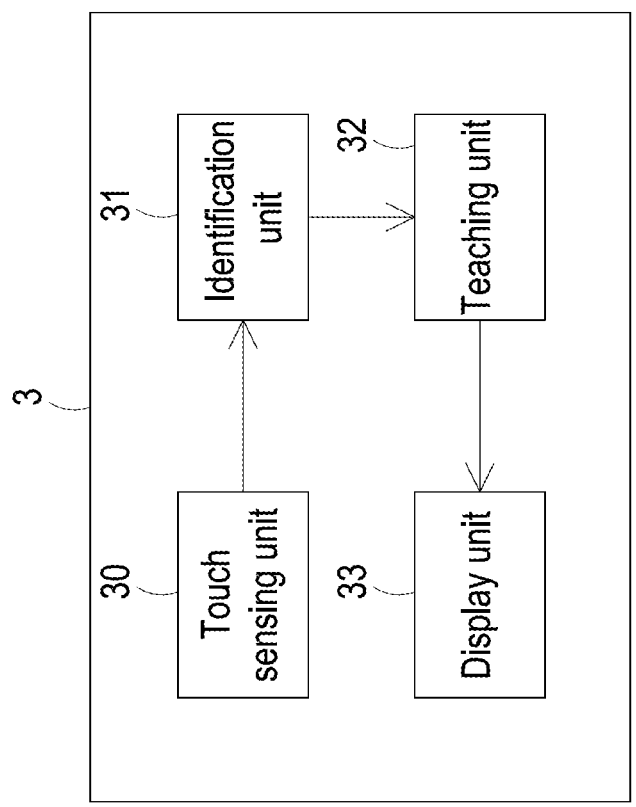
FIG. 3 is a circuit block diagram illustrating a gesture teaching device for the robotic arm system of FIG. 2.

FIG. 1 is a flowchart illustrating an action teaching method for a robotic arm according to an embodiment of the present disclosure. FIG. 2 schematically illustrates the structure of a robotic arm system using the action teaching method of FIG. 1. FIG. 3 is a circuit block diagram illustrating a gesture teaching device for the robotic arm system of FIG. 2. Please refer to FIGS. 1, 2 and 3. The action teaching method is applied to a robotic arm system 1 in order for teaching a robotic arm 2 of the robotic arm system 1.

In accordance with the present disclosure, the robotic arm 2 is automatically movable in a straight line motion mode or a curvilinear motion mode. In the straight line motion mode, the robotic arm 2 is moved along a straight line. In the curvilinear motion mode, the robotic arm 2 is moved along a curve line. The present disclosure further provides a gesture teaching device 3. The gesture teaching device 3 is disposed on the robotic arm 2 and located at an end of the robotic arm 2. Moreover, the gesture teaching device 3 includes a touch sensing unit 30, an identification unit 31, a teaching unit 32 and a display unit 33.

The touch sensing unit 30 is in communication with the identification unit 31. When the user intends to operate the robotic arm 2, the user's finger is placed on the touch sensing unit 30. Consequently, the touch condition of the user's finger is sensed by the touch sensing unit 30. For example, the touch sensing unit 30 can sense the position of each finger on the touch sensing unit 30, the force of each finger exerting on the touch sensing unit 30 and/or the time duration of each finger touching the touch sensing unit 30, and the sensing result is transmitted to the identification unit 31. The identification unit 31 is in communication with the teaching unit 32. After the sensing result from the touch sensing unit 30 is identified by the identification unit 31, the touch information about the user's finger on the touch sensing unit 30 is realized. Moreover, the touch information is transmitted to the teaching unit 32. The teaching unit 32 is in communication with the display unit 33 and the robotic arm system 1. According to the touch information from the identification unit 31, the teaching unit 32 actuates a corresponding operation of the robotic arm system 1. The operating result of the robotic arm system 1 is shown on the display unit 33. Through the display unit 33, the user judges whether the operating result of the robotic arm system 1 is successful.

Figure 4:
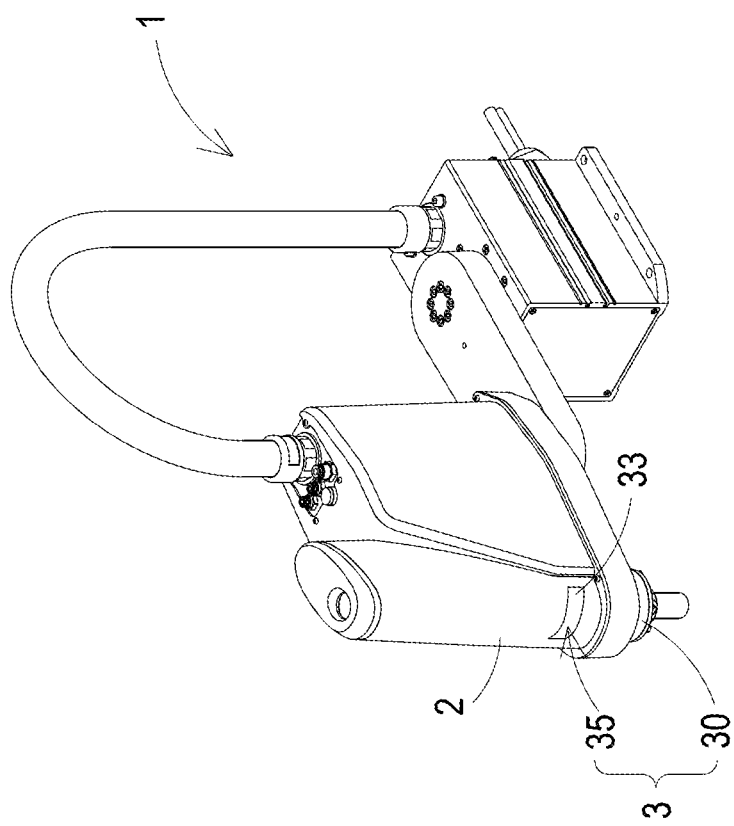
FIG. 4 is a variant example of the robotic arm system as shown in FIG. 2.

In the embodiment of FIG. 2, the gesture teaching device 3 is externally hung on an end of the robotic arm 2. Moreover, the identification unit 31 and the teaching unit 32 (not shown) are disposed within the gesture teaching device 3, and the touch sensing unit 30 and the display unit 33 are exposed outside the gesture teaching device 3. It is noted that numerous modifications and alterations may be made while retaining the teachings of the invention. FIG. 4 is a variant example of the robotic arm system as shown in FIG. 2. In the embodiment of FIG. 4, the gesture teaching device 3 is partially embedded within the robotic arm 2. The circuitry of the gesture teaching device 3 of FIG. 4 is identical to that of the gesture teaching device 3 of FIG. 2. In this embodiment, the identification unit 31, the teaching unit 32 and the display unit 33 are integrated into an integrated unit 35. The integrated unit 35 is partially embedded within the robotic arm 2, and only the display unit 33 is exposed outside the robotic arm 2. Since the touch sensing unit 30 needs to sense the touch condition of the user, the touch sensing unit 30 is also exposed to the end of the robotic arm 2.

Please refer to FIG. 1 again. The action teaching method is applied to the robotic arm system 1 of FIG. 2 and the robotic arm system 1 of FIG. 4. For clarification, the action teaching method for the robotic arm system 1 will be described as follows. Firstly, in a step S1, the user's finger is contacted with the touch sensing unit 30 to operate the robotic arm 2. Consequently, a touch condition of the user's finger is sensed by the touch sensing unit 30. In a step S2, the sensing result of the touch sensing unit 30 is transmitted to the identification unit 31. Consequently, the touch information about the user's finger on the touch sensing unit 30 is identified by the identification unit 31. In a step S3, the touch information is transmitted from the identification unit 31 to the teaching unit 32. Consequently, the teaching unit 32 actuates a corresponding operation of the robotic arm system 1 according to the touch information of the user's finger. In a step S4, the operating result of the robotic arm system 1 is shown on the display unit 33. The user judges whether the operating result is successful through the display unit 33.

In the above embodiment, the gesture teaching device 3 is installed on the robotic arm 2. Consequently, the robotic arm 2 and the gesture teaching device 3 are linked with each other. For operating the robotic arm 2 in the step S1 (e.g., moving the robotic arm 2), the user's finger is placed on the touch sensing unit 30 of the gesture teaching device 3 to exert a force on the touch sensing unit 30 and move the robotic arm 2. At the same time, the touch condition of the user's finger is sensed by the touch sensing unit 30. Moreover, a touch condition set of plural different touch conditions has been previously stored in the identification unit 31 of the gesture teaching device 3. In the step S2, the touch information about the user's finger on the touch sensing unit 30 is identified by the identification unit 31 according to the touch condition in the touch condition set. Moreover, an action command set of plural different action commands, which corresponds to the touch condition set, has been stored in the teaching unit 32. Each action command corresponds to a specified touch condition. Consequently, in the step S3, the teaching unit 32 actuates the corresponding operation of the robotic arm system 1 according to the touch information of the user's finger and the action command set.

In some embodiments, the touch sensing unit 30 includes a tactile sensor. Preferably, the tactile sensor is printed on a flexible circuit board. Consequently, the touch sensing unit 30 can be suitably installed on the robotic arm 2. The identification unit 31 includes at least one circuit (e.g., a signal amplifying circuit and a sampling circuit), an algorithm, a software component and a microcontroller. The algorithm is written in software and executed in the microcontroller. Moreover, the data is transmitted from the identification unit 31 to the teaching unit 32 through an Ethernet. The teaching unit 32 includes a set of software components and a microcontroller. When the software components are executed in the microcontroller, an action command is transmitted to the robotic arm 2 through the Ethernet. Consequently, the robotic arm 2 is capable of performing a linear motion or a point-to-point motion, recording the point information and writing the application program. Moreover, the execution result of the action command can be transmitted from the robotic arm 2 to the display unit 33 to indicate whether the operating result is successful or not. In an embodiment, the display unit 33 includes plural light-emitting elements that emit different color light beams. The color light beams from the display unit 33 indicate whether the operating result of the robotic arm system 1 is successful or not. For example, the display unit 33 includes a green LED lamp and a red LED lamp. In case that the display unit 33 emits the red light beam, the operating result of the robotic arm system 1 in the step S3 is not successful. In case that the display unit 33 emits the green light beam, the operating result of the robotic arm system 1 in the step S3 is successful. In other words, according to the 10 signal from the teaching unit 32, the display unit 34 controls the green LED lamp or the red LED lamp to flicker. Consequently, the user realizes whether the operating result of the robotic arm system 1 is successful or not. In another embodiment, the display unit 33 includes a single light-emitting element. The on state or the off state of the display unit 33 indicates whether the operating result of the robotic arm system 1 in the step S3 is successful or not. Consequently, the user can judge the operating result of the robotic arm system 1 through the display unit 33. It is noted that the structure feature and the action of the display unit 33 are not restricted. That is, the structure of the display unit 33 may be varied according to the practical requirements.

As mentioned above, the touch condition set of plural different touch conditions has been previously stored in the identification unit 31 of the gesture teaching device 3, and the action command set of plural different action commands, which corresponds to the touch condition set, has been stored in the teaching unit 32. Hereinafter, some examples of the touch conditions and the action commands will be described with reference to FIGS. 5 to 12.

Figure 5:
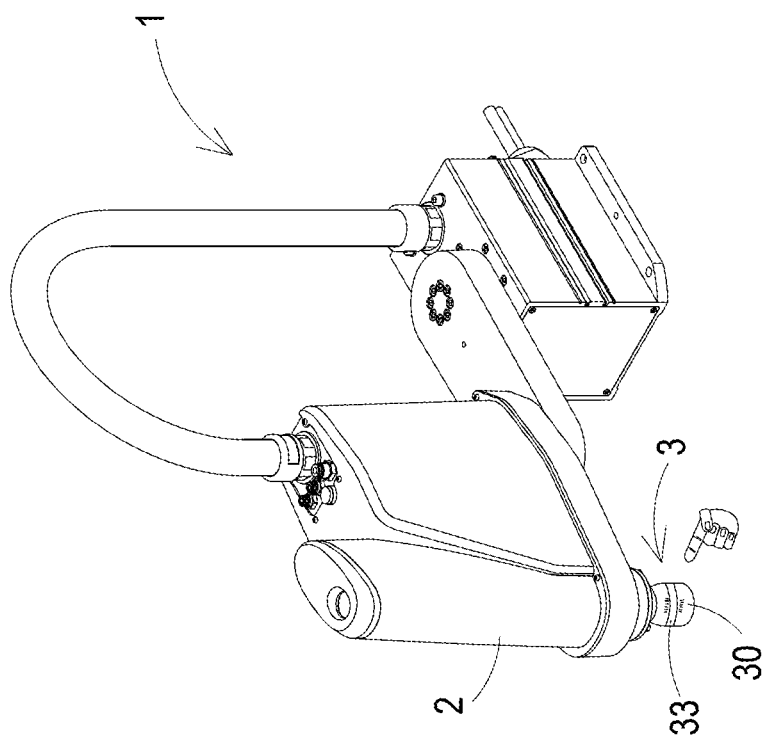
FIG. 5 schematically illustrates a first control gesture for the robotic arm of the robotic arm system as shown in FIG. 2.

FIG. 5 schematically illustrates a first control gesture for the robotic arm of the robotic arm system as shown in FIG. 2. In the first touch condition of the touch condition set, the touch sensing unit 30 is touched by the user with a single-finger tap action. The touch time of the single-finger tap action is within a first time period. In accordance with the action command corresponding to the first touch condition, the command of memorizing the current point of the robotic arm 2 is executed after the robotic arm 2 of the robotic arm system 1 is moved by the user. In the step S2, the identification unit 31 recognizes that the action of the user' finger on the touch sensing unit 30 is related to the first touch condition of the touch condition set. In the step S3, the teaching unit 32 drives the robotic arm system 1 to execute the command of memorizing the current point of the robotic arm 2.

Please refer to FIG. 5 again. In the second touch condition of the touch condition set, the touch sensing unit 30 is touched by the user with a single-finger tap action but the touch time of the single-finger tap action is over a second time period. In accordance with the action command corresponding to the second touch condition, the command of determining a finalized application program is executed by the robotic arm system 1. The point to be moved by the robotic arm 2 and the motion mode of moving the robotic arm 2 (e.g., a straight line motion mode or a curvilinear motion mode) are written into the application program. In the step S2, the identification unit 31 recognizes that the action of the user' finger on the touch sensing unit 30 is related to the second touch condition of the touch condition set. In the step S3, the teaching unit 32 drives the robotic arm system 1 to execute the command of determining the finalized application program. The second time period is longer than or equal to the first time period.

Figure 6:
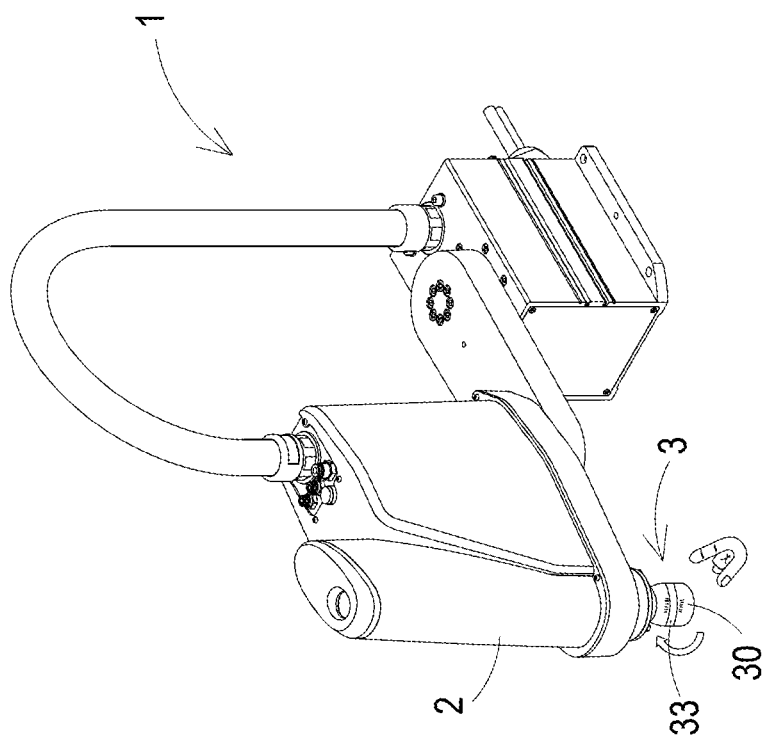
FIG. 6 schematically illustrates a second control gesture for the robotic arm of the robotic arm system as shown in FIG. 2.

FIG. 6 schematically illustrates a second control gesture for the robotic arm of the robotic arm system as shown in FIG. 2. In the third touch condition of the touch condition set, the touch sensing unit 30 is grasped by the user with a two-finger grasp action and the two fingers are horizontally rotated on the touch sensing unit 30 in a first direction (e.g., the arrow direction as shown in FIG. 6). In accordance with the action command corresponding to the third touch condition, the command of operating the robotic arm 2 in the straight line motion mode is executed by the robotic arm system 1. In the step S2, the identification unit 31 recognizes that the action of the user' finger on the touch sensing unit 30 is related to the third touch condition of the touch condition set. In the step S3, the teaching unit 32 drives the robotic arm system 1 to execute the command of operating the robotic arm 2 in the straight line motion mode.

Figure 7:
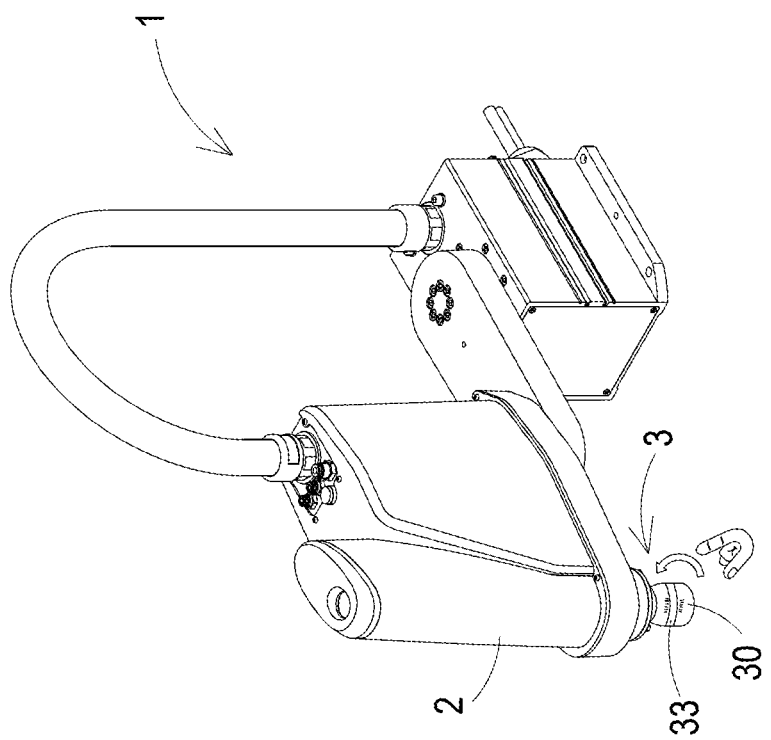
FIG. 7 schematically illustrates a third control gesture for the robotic arm of the robotic arm system as shown in FIG. 2.

FIG. 7 schematically illustrates a third control gesture for the robotic arm of the robotic arm system as shown in FIG. 2. In the fourth touch condition of the touch condition set, the touch sensing unit 30 is grasped by the user with a two-finger grasp action and the two fingers are horizontally rotated on the touch sensing unit 30 in a second direction (e.g., the arrow direction as shown in FIG. 7). In accordance with the action command corresponding to the fourth touch condition, the command of operating the robotic arm 2 in the curvilinear motion mode is executed by the robotic arm system 1. In the step S2, the identification unit 31 recognizes that the action of the user' finger on the touch sensing unit 30 is related to the fourth touch condition of the touch condition set. In the step S3, the teaching unit 32 drives the robotic arm system 1 to execute the command of operating the robotic arm 2 in the curvilinear motion mode.

Figure 8:
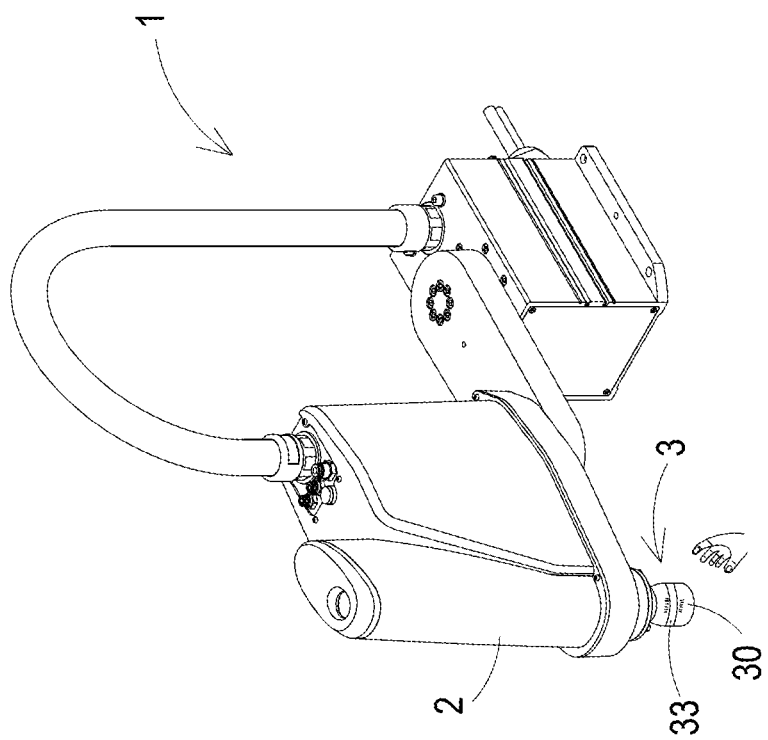
FIG. 8 schematically illustrates a fourth control gesture for the robotic arm of the robotic arm system as shown in FIG. 2.

FIG. 8 schematically illustrates a fourth control gesture for the robotic arm of the robotic arm system as shown in FIG. 2. In the fifth touch condition of the touch condition set, the touch sensing unit 30 is grasped by the user with a five-finger grasp action and a pressure in a specified direction is exerted on the touch sensing unit 30. The pressure is higher than a first value. The fifth touch condition indicates that the user directly teaches the robotic arm 2 to move with the user's hand. In accordance with the action command corresponding to the fifth touch condition, the command of controlling the robotic arm 2 to follow the user's hand is executed by the robotic arm system 1. In the step S2, the identification unit 31 recognizes that the action of the user' finger on the touch sensing unit 30 is related to the fifth touch condition of the touch condition set. In the step S3, the teaching unit 32 drives the robotic arm system 1 to execute the command of controlling the robotic arm 2 to follow the user's hand.

Please refer to FIG. 8 again. In the sixth touch condition of the touch condition set, the touch sensing unit 30 is grasped by the user with a five-finger grasp action but the pressure of each finger exerted on the touch sensing unit 30 is lower than a second value. The sixth touch condition indicates that the user intends to stop the robotic arm 2. In accordance with the action command corresponding to the sixth touch condition, the command of stopping the robotic arm 2 is executed by the robotic arm system 1. In the step S2, the identification unit 31 recognizes that the action of the user' finger on the touch sensing unit 30 is related to the sixth touch condition of the touch condition set. In the step S3, the teaching unit 32 drives the robotic arm system 1 to execute the command of stopping the robotic arm 2. The first value of the pressure is higher than or equal to the second value of the pressure.

Figure 9:
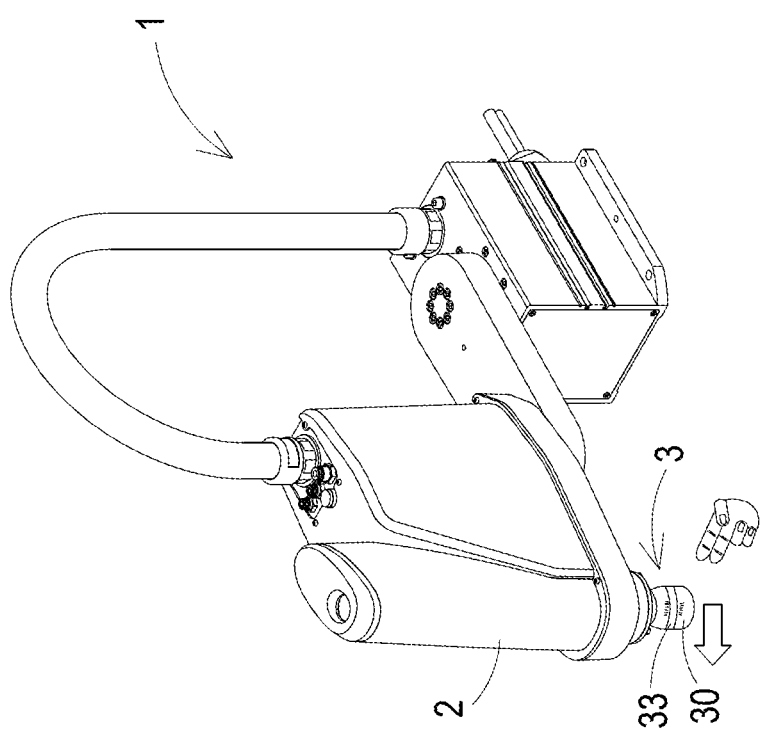
FIG. 9 schematically illustrates a fifth control gesture for the robotic arm of the robotic arm system as shown in FIG. 2.

FIG. 9 schematically illustrates a fifth control gesture for the robotic arm of the robotic arm system as shown in FIG. 2. In the seventh touch condition of the touch condition set, the touch sensing unit 30 is touched by the user with a two-finger tap action and the two fingers are horizontally moved on the touch sensing unit 30 in a third direction (e.g., the arrow direction as shown in FIG. 9). In accordance with the action command corresponding to the seventh touch condition, the robotic arm system 1 returns to the previous status—that is, the go-back command is executed. In the step S2, the identification unit 31 recognizes that the action of the user' finger on the touch sensing unit 30 is related to the seventh touch condition of the touch condition set. In the step S3, the teaching unit 32 drives the robotic arm system 1 to return to the previous status.

Figure 10:
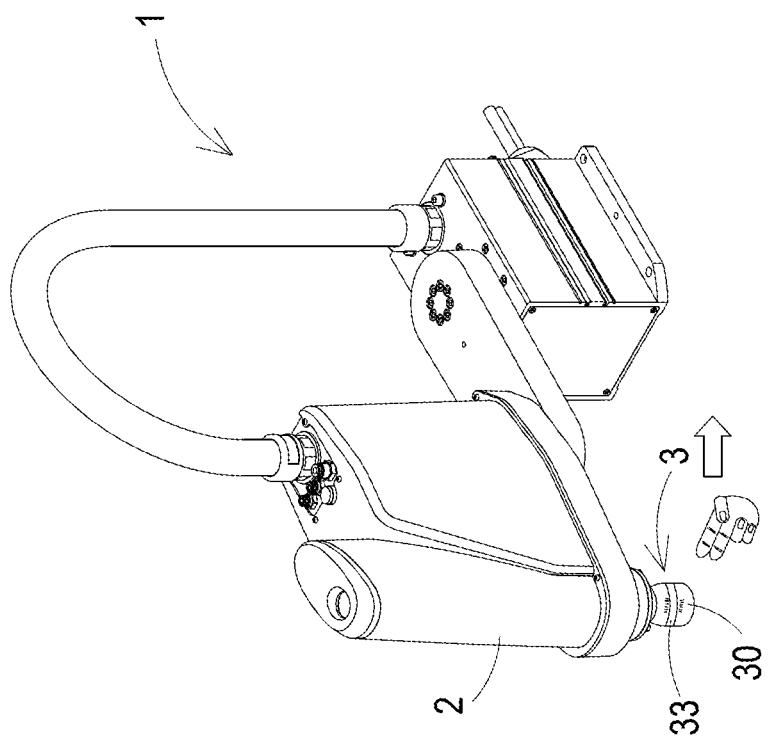
FIG. 10 schematically illustrates a sixth control gesture for the robotic arm of the robotic arm system as shown in FIG. 2.

FIG. 10 schematically illustrates a sixth control gesture for the robotic arm of the robotic arm system as shown in FIG. 2. In the eighth touch condition of the touch condition set, the touch sensing unit 30 is touched by the user with a two-finger tap action and the two fingers are horizontally moved on the touch sensing unit 30 in a fourth direction (e.g., the arrow direction as shown in FIG. 10). In accordance with the action command corresponding to the eighth touch condition, the robotic arm system 1 executes the next command, if any—that is, the go-forward command is executed. In the step S2, the identification unit 31 recognizes that the action of the user' finger on the touch sensing unit 30 is related to the eighth touch condition of the touch condition set. In the step S3, the teaching unit 32 drives the robotic arm system 1 to execute the next command.

Figure 11:
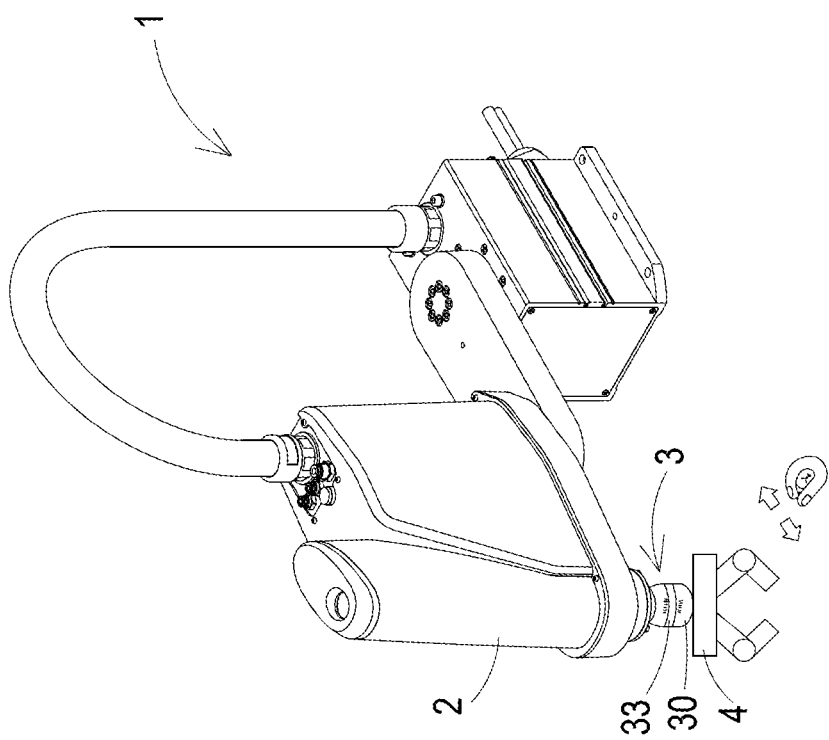
FIG. 11 schematically illustrates a seventh control gesture for the robotic arm of the robotic arm system as shown in FIG. 2.

FIG. 11 schematically illustrates a seventh control gesture for the robotic arm of the robotic arm system as shown in FIG. 2. As shown in FIG. 11, the robotic arm system 1 further includes a claw 4. The claw 4 is located under the touch sensing unit 30 of the gesture teaching device 3. The claw 4 is selectively opened or closed through the robotic arm 2. In the ninth touch condition of the touch condition set, the touch sensing unit 30 is touched by the user with two closer fingers of the user and then the two fingers are moved apart on the touch sensing unit 30 in two opposite directions. In accordance with the action command corresponding to the ninth touch condition, the command of opening the claw 4 of the robotic arm 2 is executed by the robotic arm system 1. In the step S2, the identification unit 31 recognizes that the action of the user' finger on the touch sensing unit 30 is related to the ninth touch condition of the touch condition set. In the step S3, the teaching unit 32 drives the robotic arm system 1 to open the claw 4.

FIG. 12 schematically illustrates an eighth control gesture for the robotic arm of the robotic arm system as shown in FIG. 2. In the tenth touch condition of the touch condition set, the touch sensing unit 30 is touched by two fingers of the user that are spread apart and then the two fingers are moved closer on the touch sensing unit 30 in the directions facing one another. In accordance with the action command corresponding to the tenth touch condition, the command of closing the claw 4 of the robotic arm 2 is executed by the robotic arm system 1. In the step S2, the identification unit 31 recognizes that the action of the user' finger on the touch sensing unit 30 is related to the tenth touch condition of the touch condition set. In the step S3, the teaching unit 32 drives the robotic arm system 1 to close the claw 4.

It is noted that the touch conditions of the touch condition set and the action commands of the action command set are not restricted. That is, the touch conditions of the touch condition set and the action commands of the action command set may be varied according to the practical requirements.

After the steps S1, S2, S3 and S4 are performed sequentially, the steps S1, S2, S3 and S4 are repeatedly done. Consequently, the user can teach the robotic arm 2 of the robotic arm system 1 to implement different actions. For example, if the user intends the robotic arm 2 to automatically move from an initial position to a specified position according to a straight linear motion, the action teaching method as shown in FIGS. 1 and 8 is performed firstly. That is, the touch sensing unit 30 is grasped by the user with a five-finger grasp action, and a pressure in a specified direction is exerted on the touch sensing unit 30. The pressure is higher than the first value. Consequently, the teaching unit 32 drives the robotic arm system 1 to execute the command of controlling the robotic arm 2 to follow the user's hand and writing an application program. After the robotic arm 2 is moved to the specified position, the action teaching method is performed again. Meanwhile, the touch sensing unit 30 is grasped by the user with a five-finger grasp action, but the pressure of each finger exerted on the touch sensing unit 30 is lower than the second value. Consequently, the teaching unit 32 drives the robotic arm system 1 to execute the command of stopping the robotic arm 2 and writing the application program. Then, the action teaching method as shown in FIGS. 1 and 5 is performed. That is, the touch sensing unit 30 is touched by the user with a single-finger tap action. The touch time of the single-finger tap action is within the first time period. Consequently, the teaching unit 32 drives the robotic arm system 1 to execute the command of memorizing the current point of the robotic arm 2 and writing the application program. Then, the action teaching method as shown in FIGS. 1 and 6 is performed. That is, the touch sensing unit 30 is grasped by the user with a two-finger grasp action and the two fingers are horizontally rotated on the touch sensing unit 30 in a first direction. Consequently, the teaching unit 32 drives the robotic arm system 1 to execute the command of operating the robotic arm 2 in the straight line motion mode and writing the application program. Then, the action teaching method as shown in FIG. 1 is performed again. That is, the touch sensing unit 30 is touched by the user with a single-finger tap action. Consequently, the command of determining a finalized application program is executed by the robotic arm system 1. After the above procedures are performed, the steps of moving the robotic arm, teaching the robotic arm and writing the application program are completed. Consequently, the automatic movement of the robotic arm is controlled according to the user's intention.

From the above descriptions, the present disclosure provides an action teaching method for a robotic arm and a gesture teaching device using the action teaching method. When the user's finger is contacted with the gesture teaching device to operate the robotic arm, the touch condition of the finger is sensed by the gesture teaching device. The user is able to intuitively operate the robotic arm without the need of additionally using the teach pendant or the computer software. By directly touching the gesture teaching device, the three steps of moving the robotic arm, teaching the robotic arm and writing the application program are integrated. In other words, the action teaching method of the present disclosure is nimble and intuitive.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An action teaching method for teaching a robotic arm of a robotic arm system through a gesture teaching device, the gesture teaching device being installed on the robotic arm, the action teaching method comprising:
    (a) allowing a finger of a user to be contacted with a touch sensing unit of the gesture teaching device to operate the robotic arm, so that a touch condition of the finger is sensed by the touch sensing unit;
    (b) transmitting a sensing result of the touch sensing unit to an identification unit of the gesture teaching device, so that a touch information about the finger of the user on the touch sensing unit is identified by the identification unit;
    (c) transmitting the touch information from the identification unit to a teaching unit of the gesture teaching device, so that the teaching unit actuates a corresponding operation of the robotic arm system according to the touch information; and
    (d) allowing an operating result of the robotic arm system to be shown on a display unit of the gesture teaching device, so that the user judges whether the operating result of the robotic arm system is successful through the display unit.

2. The action teaching method according to claim 1, wherein a touch condition set has been previously stored in the identification unit, wherein in the step (b), the touch information is identified by the identification unit according to the touch condition and the touch condition set.

3. The action teaching method according to claim 2, wherein an action command set corresponding to the touch condition set has been previously stored in the teaching unit, wherein in the step (c), the teaching unit actuates the corresponding operation of the robotic arm system according to the touch information and the action command set.

4. The action teaching method according to claim 3, wherein the action command set includes a command of memorizing a current point of the robotic arm after the robotic arm of the robotic arm system is moved by the user, wherein if the identification unit recognizes that the touch information is related to a first touch condition of the touch condition set in the step (b), the teaching unit drives the robotic arm system to execute the command of memorizing the current point of the robotic arm in the step (c).

5. The action teaching method according to claim 3, wherein the action command set includes a command of determining a finalized application program, wherein a point to be moved by the robotic arm and a motion mode of moving the robotic arm are written into the application program, and if the identification unit recognizes that the touch information is related to a second touch condition of the touch condition set in the step (b), the teaching unit drives the robotic arm system to execute the command of determining the finalized application program in the step (c).

6. The action teaching method according to claim 3, wherein the robotic arm is movable along a straight line in a straight line motion mode, and the action command set includes a command of operating the robotic arm in the straight line motion mode, wherein if the identification unit recognizes that the touch information is related to a third touch condition of the touch condition set in the step (b), the teaching unit drives the robotic arm system to execute the command of operating the robotic arm in the straight line motion mode in the step (c).

7. The action teaching method according to claim 3, wherein the robotic arm is movable along a curve line in a curvilinear motion mode, and the action command set includes a command of operating the robotic arm in the curvilinear motion mode, wherein if the identification unit recognizes that the touch information is related to a fourth touch condition of the touch condition set in the step (b), the teaching unit drives the robotic arm system to execute the command of operating the robotic arm in the curvilinear motion mode in the step (c).

8. The action teaching method according to claim 3, wherein the action command set includes a command of controlling the robotic arm to follow a hand of the user, wherein if the identification unit recognizes that the touch information is related to a fifth touch condition of the touch condition set in the step (b), the teaching unit drives the robotic arm system to execute the command of controlling the robotic arm to follow the hand of the user in the step (c).

9. The action teaching method according to claim 3, wherein the action command set includes a command of stopping the robotic arm, wherein if the identification unit recognizes that the touch information is related to a sixth touch condition of the touch condition set in the step (b), the teaching unit drives the robotic arm system to execute the command of stopping the robotic arm in the step (c).

10. The action teaching method according to claim 3, wherein the action command set includes a command of executing a go-back command, wherein if the identification unit recognizes that the touch information is related to a seventh touch condition of the touch condition set in the step (b), the teaching unit drives the robotic arm system to execute the go-back command in the step (c).

11. The action teaching method according to claim 3, wherein the action command set includes a command of executing a go-forward command, wherein if the identification unit recognizes that the touch information is related to an eighth touch condition of the touch condition set in the step (b), the teaching unit drives the robotic arm system to execute the go-forward command in the step (c).

12. The action teaching method according to claim 3, wherein the robotic arm system further comprises a claw, and the claw is located under the touch sensing unit, wherein the claw is selectively opened or closed through the robotic arm.

13. The action teaching method according to claim 12, wherein the action command set includes a command of controlling the robotic arm to open the claw, wherein if the identification unit recognizes that the touch information is related to a ninth touch condition of the touch condition set in the step (b), the teaching unit drives the robotic arm system to execute the command of controlling the robotic arm to open the claw in the step (c).

14. The action teaching method according to claim 12, wherein the action command set includes a command of controlling the robotic arm to close the claw, wherein if the identification unit recognizes that the touch information is related to a tenth touch condition of the touch condition set in the step (b), the teaching unit drives the robotic arm system to execute the command of controlling the robotic arm to close the claw in the step (c).

15. A gesture teaching device installed on a robotic arm of a robotic arm system for teaching the robotic arm, the gesture teaching device comprising:
- a touch sensing unit, wherein when a finger of a user is contacted with the touch sensing unit to operate the robotic arm, a touch condition of the finger is sensed by the touch sensing unit;
- an identification unit in communication with the touch sensing unit, wherein according to a sensing result from the touch sensing unit, a touch information about the finger of the user on the touch sensing unit is identified by the identification unit;
- a teaching unit in communication with the identification unit and the robotic arm system, wherein the teaching unit actuates a corresponding operation of the robotic arm system according to the touch information; and
- a display unit, wherein an operating result of the robotic arm system is shown on the display unit, so that the user judges whether the operating result of the robotic arm system is successful through the display unit.

16. The gesture teaching device according to claim 15, wherein a portion of the gesture teaching device is embedded within the robotic arm.

17. The gesture teaching device according to claim 15, wherein the gesture teaching device is externally hung on the robotic arm.

18. The gesture teaching device according to claim 15, wherein the touch sensing unit includes a tactile sensor, wherein when the finger of the user is placed on the touch sensing unit to touch the touch sensing unit, a position of the finger on the touch sensing unit, a force of the finger exerting on the touch sensing unit and/or a time duration of the finger touching the touch sensing unit are sensed by the tactile sensor.

* * * * *